(12) United States Patent
Arimoto

(10) Patent No.: US 12,241,300 B1
(45) Date of Patent: Mar. 4, 2025

(54) FRAMELESS DOOR WINDOW REGULATOR ADJUSTMENT ASSEMBLY

(71) Applicant: Shigeki Arimoto, Bloomfield Hills, MI (US)

(72) Inventor: Shigeki Arimoto, Bloomfield Hills, MI (US)

( * ) Notice: Subject to any disclaimer, the term of this patent is extended or adjusted under 35 U.S.C. 154(b) by 0 days.

(21) Appl. No.: 18/238,541

(22) Filed: Aug. 28, 2023

(51) Int. Cl.
  *E05D 15/10* (2006.01)
  *B60J 1/14* (2006.01)
  *B60J 1/17* (2006.01)
  *E05F 11/38* (2006.01)

(52) U.S. Cl.
  CPC .............. *E05F 11/382* (2013.01); *B60J 1/14* (2013.01); *B60J 1/17* (2013.01); *E05Y 2201/638* (2013.01); *E05Y 2201/684* (2013.01)

(58) Field of Classification Search
  CPC ... E05F 11/382; B60J 1/14; B60J 1/17; E05Y 2201/638; E05Y 2201/684
  USPC .......................................................... 49/212
  See application file for complete search history.

(56) References Cited

U.S. PATENT DOCUMENTS

| | | | | |
|---|---|---|---|---|
| 7,640,697 B2 * | 1/2010 | Florentin | ............... | E05F 11/382 49/502 |
| 8,069,610 B2 * | 12/2011 | Graf | ...................... | E05F 11/382 49/212 |
| 8,127,493 B2 * | 3/2012 | Cappelli | ............... | E05F 11/382 49/212 |
| 8,528,259 B1 * | 9/2013 | Heirtzler | ............... | E05F 11/382 49/506 |
| 2007/0214726 A1 * | 9/2007 | Graf | ...................... | E05F 11/382 49/352 |

FOREIGN PATENT DOCUMENTS

| | | | | |
|---|---|---|---|---|
| DE | 10014946 A1 * | 9/2001 | ............ | E05F 11/483 |
| DE | 10204610 A1 * | 8/2003 | ............ | E05F 11/382 |

* cited by examiner

*Primary Examiner* — Jerry E Redman

(57) ABSTRACT

A frameless door window regulator adjustment assembly comprises upper and lower guide rail attachments for precise glass positioning. The lower guide rail attachment, mounted on the door inner panel, includes a guide rail bracket and a window regulator bracket sandwiching a cam plate. The guide rail bracket has a slot and a stud bolt, aligned with the camshaft hole and slot on the window regulator bracket, respectively. The cam plate features an anti-rotation hole and a cam plate slot, aligned with the slot and the stud bolt on the guide rail bracket and the camshaft hole and slot on the window regulator bracket, respectably. The camshaft connects the window regulator bracket and the cam plate, enabling controlled movement of the guide rail bracket and glass tilting. The camshaft and cam plate are non-rotatably connected and may be made of durable materials like steel or die-casting, and may be a one-piece part. Fasteners secure the camshaft and cam plate to the guide rail bracket, simplifying assembly.

13 Claims, 12 Drawing Sheets

FRAMELESS DOOR WINDOW REGULATOR ADJUSTMENT ASSEMBLY

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a frameless door window regulator adjustment assembly. More particularly, the present disclosure relates to a lower guide rail attachment of a frameless door window regulator adjustment assembly configured to tilt a guide rail and a glass.

BACKGROUND

The field of invention pertains to a frameless door window regulator adjustment assembly that requires a glass tilting function. Traditional window regulators typically consist of upper and lower guide rail attachments. The upper attachment includes a rocking nut, spring pin, and jacking screw, which allow it to be rotated. On the other hand, the lower guide rail attachment is fixed to the bottom surface of the door inner panel through an additional bracket featuring a slot hole. This slot hole enables the adjustment of the attachment position to tilt both the guide rail and the glass as necessary.

In modern automotive design, frameless door window regulators have gained popularity due to their sleek appearance and enhanced aesthetics. However, these frameless systems require a mechanism that can effectively tilt the glass to improve functionality, ensure a proper seal, and optimize the driver's and passengers' overall comfort and safety. The current window regulator's glass tilting function faces certain challenges that hinder its effectiveness. One of the major challenges is the manual adjustment of the attachment stud bolt responsible for tilting the glass. The need for manual intervention makes it difficult to maintain a precise position, and it lacks micro-adjustment capabilities. Consequently, this poses difficulties in achieving the desired position for the glass, leading to potential issues such as noise, wind leaks, and suboptimal sealing, impacting the overall performance of the window regulator.

To address the challenges mentioned above and enhance the functionality of the frameless door window regulator adjustment assembly, there is a pressing need for an innovative solution. The ideal solution should offer a convenient and reliable way to adjust the attachment stud bolt, enabling efficient and accurate glass tilting without requiring manual intervention. Moreover, the solution should incorporate micro-adjustment capabilities to achieve fine-tuned positioning, ensuring a proper seal and preventing unwanted noise or wind leaks.

To overcome the limitations of the manual adjustment of the attachment stud bolt, the proposed solution involves the implementation of a cam mechanism. With this innovative cam mechanism, the glass tilting function can be precisely controlled and improves the overall efficiency and convenience of the frameless door window regulator adjustment assembly but also ensures optimal glass positioning, thereby enhancing the window regulator's performance and passenger comfort.

SUMMARY

The following invention presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards an improved frameless door window regulator adjustment assembly with a glass tilting function that overcomes the challenges posed by existing mechanisms.

Another objective of the present disclosure is to achieve precise positioning of the glass in the frameless door window regulator.

Another objective of the present disclosure is to eliminate the need for manual adjustment of the attachment stud bolt.

Another objective of the present disclosure is to offer micro-adjustment capabilities, ensuring accurate glass tilting.

Another objective of the present disclosure is to prevent misalignments and optimize the glass tip position, promoting better sealing and reducing potential noise and wind leaks.

Another objective of the present disclosure is to enhance user convenience by providing a more user-friendly and intuitive adjustment mechanism.

Another objective of the present disclosure is to optimize passenger comfort by preventing unwanted noise and air leaks commonly associated with poorly positioned window glasses.

Another objective of the present disclosure is to offer a cost-effective solution for frameless door window regulators with a glass tilting function.

According to an exemplary aspect of the present disclosure, the frameless door window regulator adjustment assembly includes a lower guide rail attachment mounted at lower portion of a guide rail.

According to another exemplary aspect of the present disclosure, the lower guide rail attachment configured to tilt a guide rail and a glass.

According to another exemplary aspect of the present disclosure, the lower guide rail attachment comprises a guide rail bracket and a window regulator bracket mounted on a door inner panel.

According to another exemplary aspect of the present disclosure, there is a cam plate sandwiched between the guide rail bracket and the window regulator bracket.

According to another exemplary aspect of the present disclosure, the guide rail bracket configured with a guide rail bracket slot and a stud bolt, the window regulator bracket configured with a window regulator bracket slot and a camshaft hole.

According to another exemplary aspect of the present disclosure, the guide rail bracket slot is aligned with the camshaft hole of the window regulator bracket, and the stud bolt of the guide rail bracket is aligned with the window regulator bracket slot. This alignment enables precise positioning of the glass by facilitating controlled movement of the guide rail bracket along the window regulator bracket slot.

According to another exemplary aspect of the present disclosure, the cam plate configured with an anti-rotation hole and a cam plate slot, whereby the anti-rotation hole of the cam plate aligned with the guide rail bracket slot and the camshaft hole of the window regulator bracket.

According to another exemplary aspect of the present disclosure, the cam plate slot aligned with the stud bolt of the guide rail bracket and the window regulator bracket slot.

According to another exemplary aspect of the present disclosure, the stud bolt of the guide rail bracket configured to connect the guide rail bracket and the window regulator bracket by introducing the stud bolt through the cam plate slot and the window regulator bracket slot.

According to another exemplary aspect of the present disclosure, a camshaft configured to connect the window regulator bracket and the cam plate by introducing the camshaft through the camshaft hole of the window regulator bracket and the anti-rotation hole of the cam plate.

According to another exemplary aspect of the present disclosure, the frameless door window regulator adjustment assembly features a user-controlled glass tilting function. The camshaft empowers users to control the glass tilting by merely rotating the camshaft. This user-friendly feature enhances convenience, enabling vehicle occupants to effortlessly adjust the glass position as required, addressing the objective of enhancing user convenience.

According to another exemplary aspect of the present disclosure, the camshaft and cam plate are non-rotatably connected. This design ensures that their relative positions remain fixed during operation, enhancing stability and reducing the likelihood of unintentional adjustments, thereby contributing to smooth and controlled glass movement.

According to another exemplary aspect of the present disclosure, the window regulator bracket exhibits versatility in design. It can be either assembled onto the window regulator or built as an integral part of the vehicle door assembly. This adaptability allows the frameless door window regulator adjustment assembly to be seamlessly integrated into various window regulator designs, supporting the objective of integration with existing components.

According to another exemplary aspect of the present disclosure, the guide rail bracket exhibits versatility in design. It can be either assembled onto the window regulator or built as an integral part of the guide rail.

According to another exemplary aspect of the present disclosure, the camshaft exhibits versatility in design. It can be either assembled onto the cam plate or built as an integral part of the cam plate.

According to another exemplary aspect of the present disclosure, the camshaft and cam plate are constructed from durable materials, such as machined steel, stamped steel, cold-headed steel, or powder metal, or as a Zinc/Aluminum die-casting. This choice of materials enhances the longevity and reliability of the assembly, contributing to the objective of increased durability and longevity.

According to another exemplary aspect of the present disclosure, the cam plate is designed to be sandwiched between the guide rail bracket and the window regulator bracket. This configuration provides ample surface area for secure clamping with screws, ensuring a stable connection and secure fixation of the window regulator to the door, further reinforcing the objective of securely fixing the window regulator.

According to another exemplary aspect of the present disclosure, the camshaft and cam plate are pre-attached to the guide rail bracket through the guide rail bracket slot by a fastener, such as screws, bolts, nuts, C-clips, push nuts, or staking. This pre-assembly simplifies manufacturing processes and reduces installation complexities, aligning with the objective of integration with existing components.

According to another exemplary aspect of the present disclosure, the fastener securing the camshaft and cam plate to the guide rail bracket may include an elastic washer. This washer engages with the camshaft, ensuring non-rotatable engagement while temporarily engaging with the guide rail bracket slot. It maintains the camshaft and cam plate in the nominal position until the window regulator is installed to the window regulator bracket, contributing to an innovative fastening mechanism.

According to another exemplary aspect of the present disclosure, the washer disengages to the guide rail bracket slot when the camshaft is rotated.

According to another exemplary aspect of the present disclosure, when the window regulator bracket is built as part of the window regulator assembly, the guide rail bracket slot and pre-assembly of the camshaft and cam plate to the guide rail bracket are not required. This design simplification streamlines assembly processes and enhances the overall efficiency of manufacturing, supporting the objective of integration with existing components.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

DETAILED DESCRIPTION OF EXAMPLE EMBODIMENTS

Figure 1A:
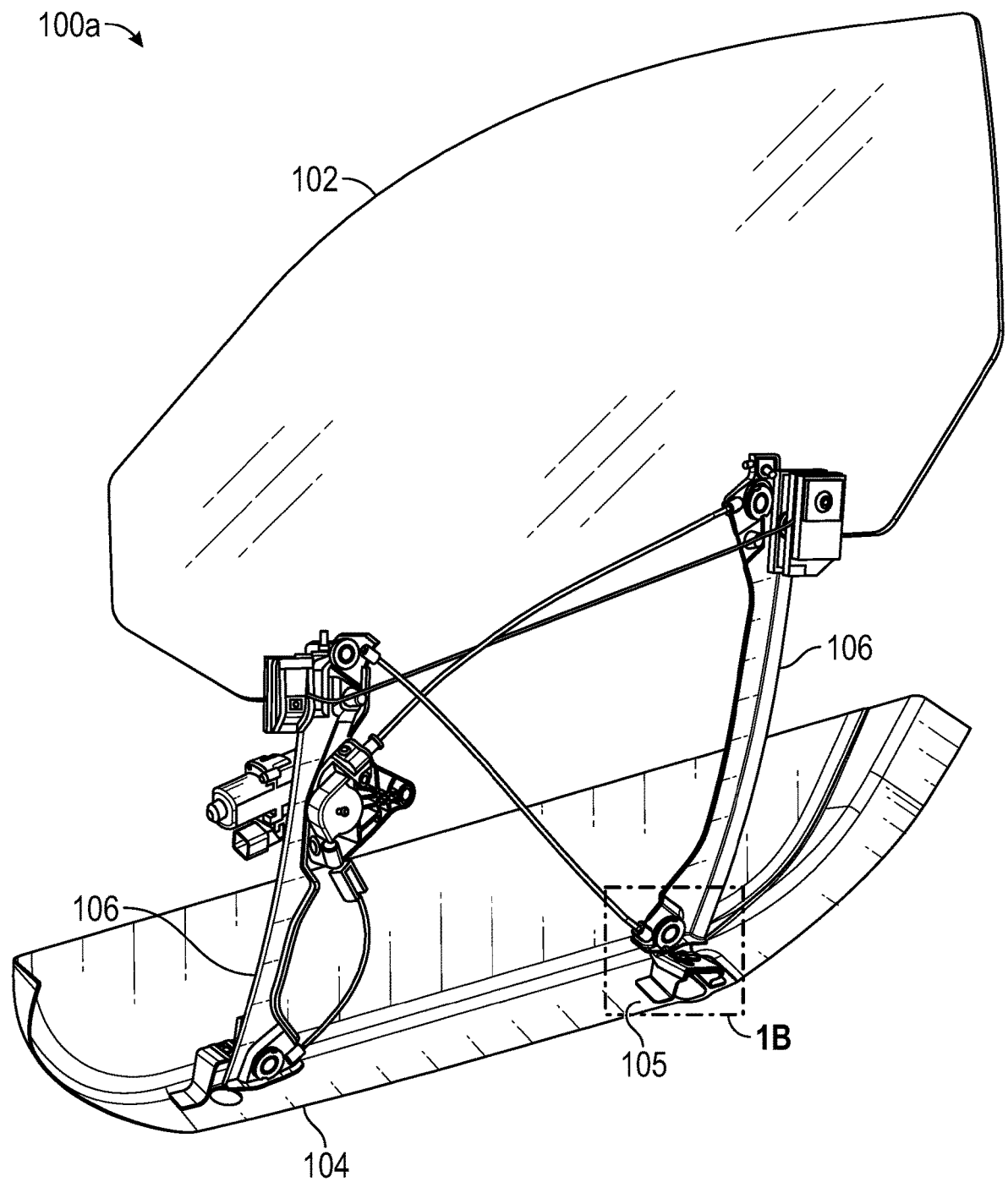
FIG. 1A is a diagram depicting frameless door window regulator, in accordance with one or more exemplary embodiments.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1A is an example diagram 100a may potentially depict a frameless door window regulator assembly, showcasing one or more exemplary embodiments. The diagram 100a depicting a glass 102, which may represent the window glass panel responsible for smooth vertical movement within the body frame, allowing for convenient window opening and closing. The door inner panel 104, serving as the inner part of the vehicle door where various components, possibly including the window regulator, may be mounted. The lower guide rail attachment assembly 105, an essential element that may play a crucial role in guiding and possibly regulating the motion of the window glass, potentially facilitating precise and smooth movement as it travels up and down within the body frame and the guide rail 106, conceivably designed as a track-like structure intended to guide the glass panel during its movement, potentially providing stability and appropriate alignment.

The frameless door window regulator assembly, depicted in FIG. 1A, could potentially operate with exemplary functionality. The glass panel 102 might efficiently move up and down within the body frame. The secure mounting of the guide rail 106 on the vehicle's door inner panel 104 could potentially ensure stability during operation. The lower guide rail attachment assembly 105 may play a significant role in guiding and regulating the glass's movement within the body frame, providing an advanced and user-friendly window experience.

Figure 1B:
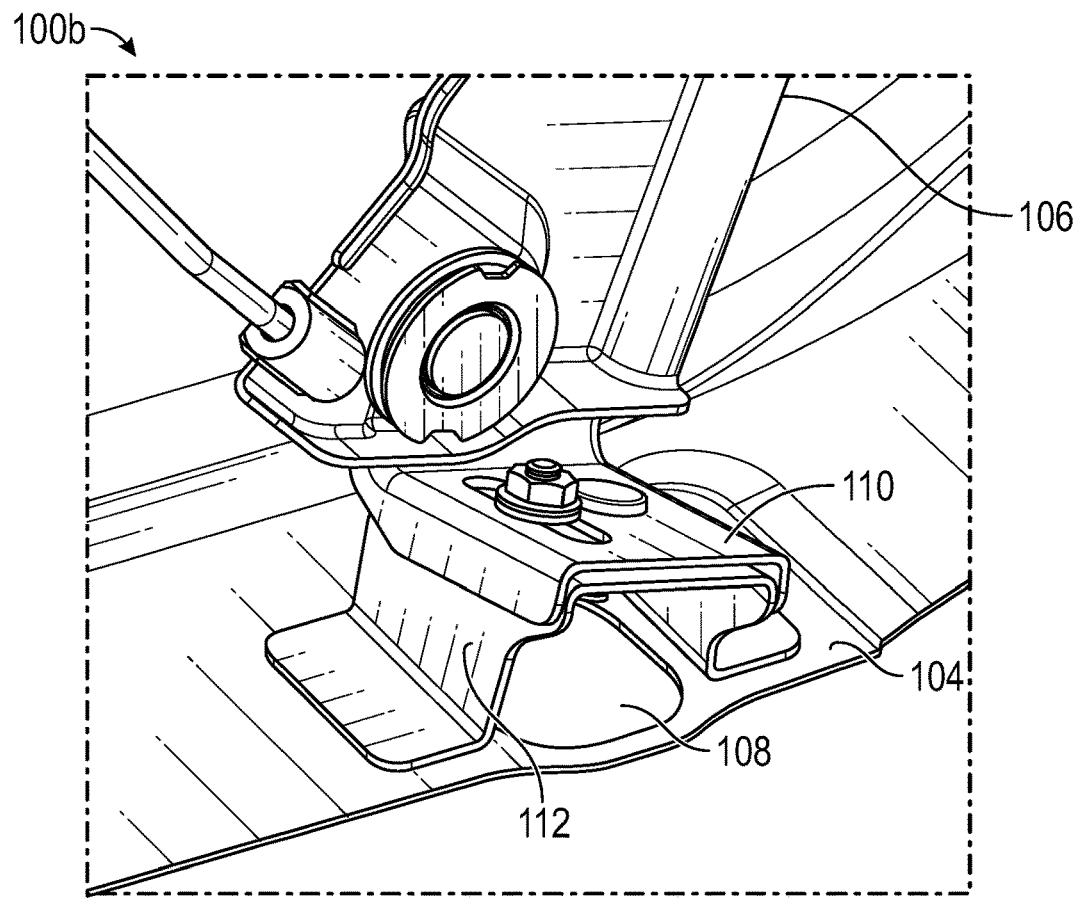
FIG. 1B is a diagram depicting a detailed view of the lower guide rail attachment assembly, in accordance with one or more exemplary embodiments.

Referring to FIG. 1B is a diagram 100b depicting a detailed view of the lower guide rail attachment assembly in accordance with one or more exemplary embodiments. The diagram 100b depicting door inner panel 104, which may potentially refer to the inner part of the vehicle door where various components, including the window regulator assembly, are mounted.

Additionally, the guide rail 106 could be a track-like structure designed to guide the movement of the window glass panel within the door frame, ensuring smooth and stable vertical motion. The access hole 108, may serve as an access point providing entry to specific components or mechanisms within the lower guide rail attachment assembly, facilitating maintenance or adjustments. Moreover, the guide rail bracket 110 could play a significant role in securely supporting and holding the guide rail 106, ensuring proper alignment and optimal functionality. Lastly, the window regulator bracket 112 might act as a crucial support structure for the window regulator mechanism within the door, enabling precise and controlled movement of the window glass.

Figure 1C:
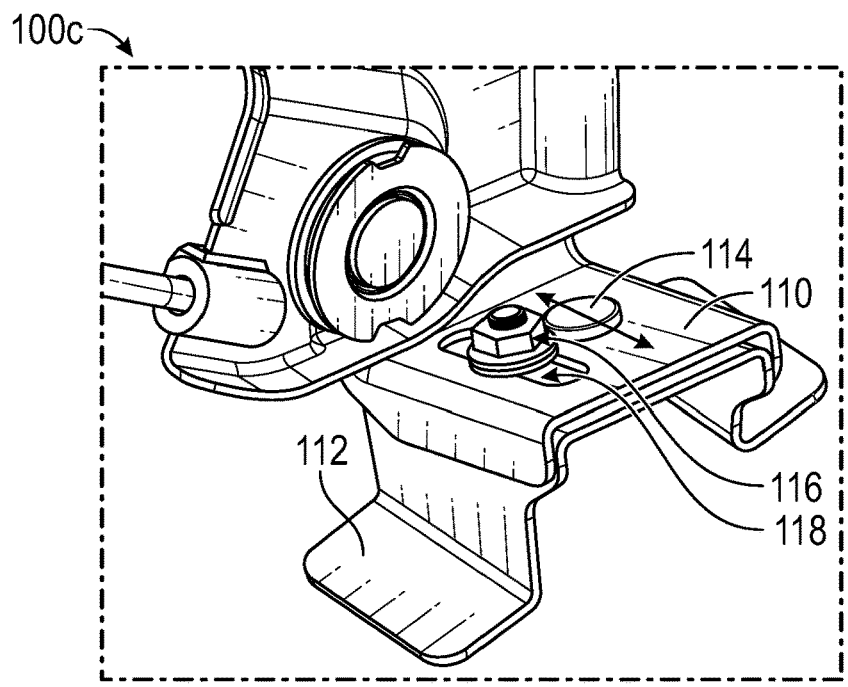
FIG. 1C is a diagram depicting an exemplary view of the lower guide rail attachment assembly according to a preferred embodiment of the invention.

Referring to FIG. 1C is a diagram 100c depicting an exemplary view of the lower guide rail attachment assembly according to a preferred embodiment of the invention. The diagram 100c depicting the guide rail bracket 110, which could serve as a crucial structural element, potentially providing essential support to the guide rail and ensuring optimal alignment and stability. The window regulator bracket 112 may act as a pivotal component, facilitating the potential mounting and support of the window regulator mechanism within the door, enabling smooth and user-friendly window operation.

Furthermore, the stud bolt 114 may play a vital role in potentially securing and connecting the guide rail bracket and the window regulator bracket, contributing to the overall stability and alignment of the assembly. The cam shaft 116, may potentially empower users with a user-friendly glass tilting function, allowing effortless adjustment of the glass position as needed. Additionally, the guide rail bracket slot 118 could potentially facilitate controlled movement or adjustment of the guide rail bracket, contributing to precise positioning and smooth operation of the assembly.

Figure 1D:
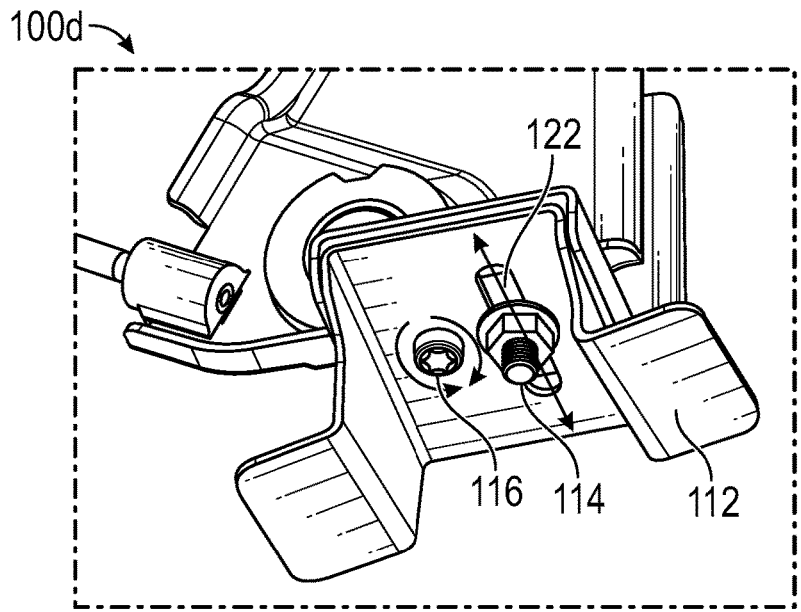
FIG. 1D is a diagram depicting an exemplary view of the lower guide rail attachment assembly according to a preferred embodiment of the invention.

Referring to FIG. 1D is a diagram 100d depicting the bottom portion of the lower guide rail attachment assembly according to a preferred embodiment of the invention. The diagram 100d depicting the window regulator bracket 112, the stud bolt 114, the camshaft 116, and the window regulator bracket slot 122. The camshaft 116 rotation enables the stud bolt 114 to move within the window regulator bracket slot 122, the rotary motion of the camshaft is transmitted to the stud bolt and enabling the guide rail bracket to move along the slot of the window regulator bracket 112, thereby tilting the guide rail and the glass via the window regulator adjustment assembly. The ability to rotate the cam shaft allows users to effortlessly adjust the glass position as needed, enhancing user convenience.

Figure 2:
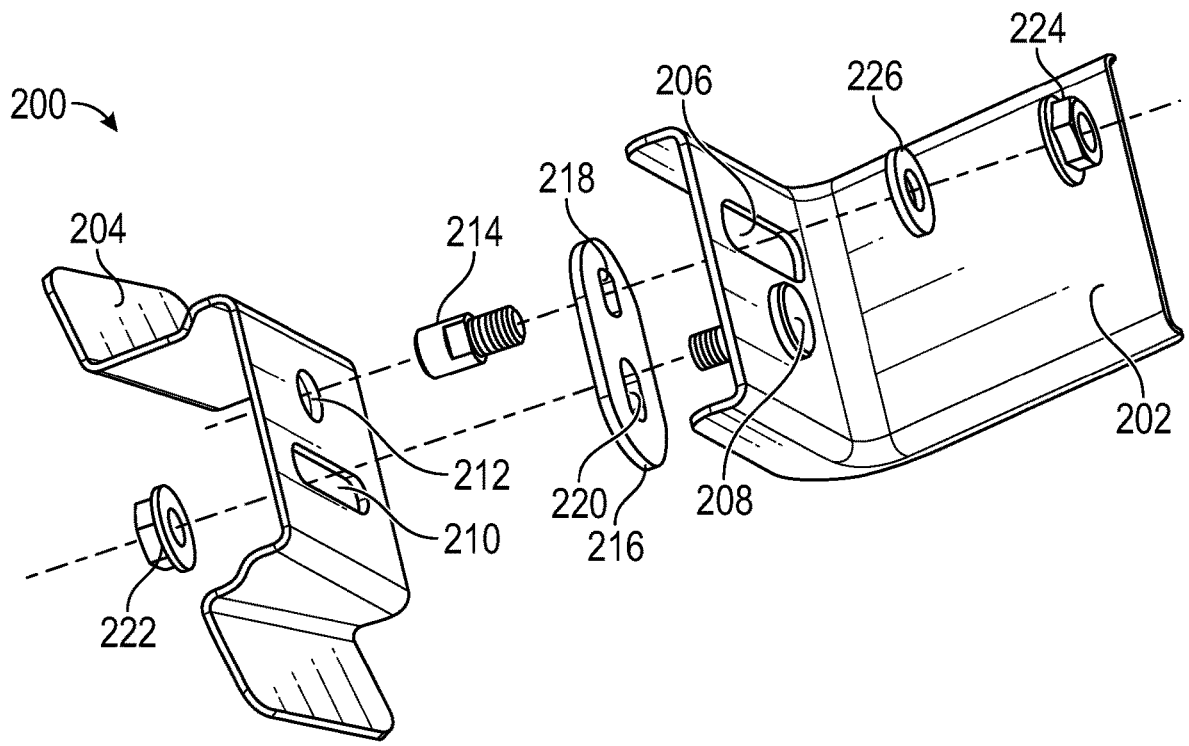
FIG. 2 is a diagram depicting an exploded view of the lower guide rail attachment assembly according to a preferred embodiment of the invention.

Referring to FIG. 2 is a diagram 200 depicting an exploded view of the lower guide rail attachment assembly, showcasing one or more exemplary embodiments of the invention. The diagram 200 depicting the guide rail bracket 202 that potentially supports and aligns the guide rail, enabling smooth and controlled movement of the window glass. The window regulator bracket 204 may act as a mounting bracket, the guide rail bracket slot 206, the stud bolt 208 may serve as a secure connector between the guide rail bracket and the window regulator bracket, ensuring stability and proper alignment. The window regulator bracket slot 210, the camshaft hole 212 and the camshaft 214. The camshaft hole may accommodate the cam shaft, which may play a significant role in providing users with a user-friendly glass tilting function. The camshaft may enable users to control the glass tilting by rotating it, allowing for convenient adjustment of the glass position as desired. The cam plate 216 may facilitate controlled movement and transmission of motion within the assembly, enhancing the overall functionality. The anti-rotation hole 218 in the cam plate 216 may align with the guide rail bracket slot 206 and the camshaft hole 212, potentially preventing unintended rotation and ensuring stability. The cam plate slot 220 may align with the stud bolt 208 of the guide rail bracket 202 and the window regulator bracket slot 210, potentially enabling smooth movement and transmission of motion. The stud bolt nut 222 may be used to secure the stud bolt 208 in place, ensuring a robust connection between the guide rail bracket 202 and the window regulator bracket 204. The camshaft nut 224 may secure the cam shaft 214, potentially preventing any undesired movements. The washer 226 may engage with the cam shaft 214, potentially providing non-rotatable engagement while temporarily engaging with the guide rail bracket slot 206.

By rotating the camshaft 214 introduced through the camshaft hole 212 of the window regulator bracket 204 and the anti-rotation hole 218 of the cam plate 216, users may conveniently adjust the glass position as required.

The camshaft hole 212 of the window regulator bracket 204 may be thoughtfully designed to not only support the camshaft 214 but also precisely locate it, facilitating smooth and controlled rotation. In order to enhance stability and prevent unintended adjustments during operation, the camshaft 214 and cam plate 216 may be meticulously non-rotatably connected. These essential components, namely the camshaft and cam plate, may be crafted with durable materials such as machined steel, stamped steel, cold-headed steel, or powder metal, and they may also be fabricated using Zinc/Aluminum die-casting, ensuring longevity and reliability of the assembly.

Moreover, the design of the cam plate 216 may incorporate an intelligent feature being sandwiched between the guide rail bracket 202 and the window regulator bracket 204 providing ample surface area for secure clamping. The utilization of a nut 222 may securely clamp the cam plate 216, thereby fixing the window regulator firmly to the door.

To streamline the assembly process and ensure efficient manufacturing, the camshaft and cam plate may be pre-attached to the guide rail bracket 202 through the guide rail bracket slot 206. The pre-assembly may be achieved using versatile fasteners, which may include screws, bolts, nuts, C-clips, push nuts, or staking, depending on the specific requirements of the assembly. Additionally, the camshaft and cam plate may be thoughtfully designed to be rotatably and slide-ably secured to the guide rail bracket 202 through the guide rail bracket slot 206, allowing for precise adjustments and smooth functioning.

It's important to note that the use of fasteners in this exemplary embodiment is not restricted to any particular type, offering the flexibility to choose appropriate fasteners based on the assembly conditions and specific design considerations. The adaptability of the fasteners ensures that the assembly process can be optimized to suit various implementation scenarios, further contributing to the versatility and efficacy of the frameless door window regulator adjustment assembly.

Figure 3A:
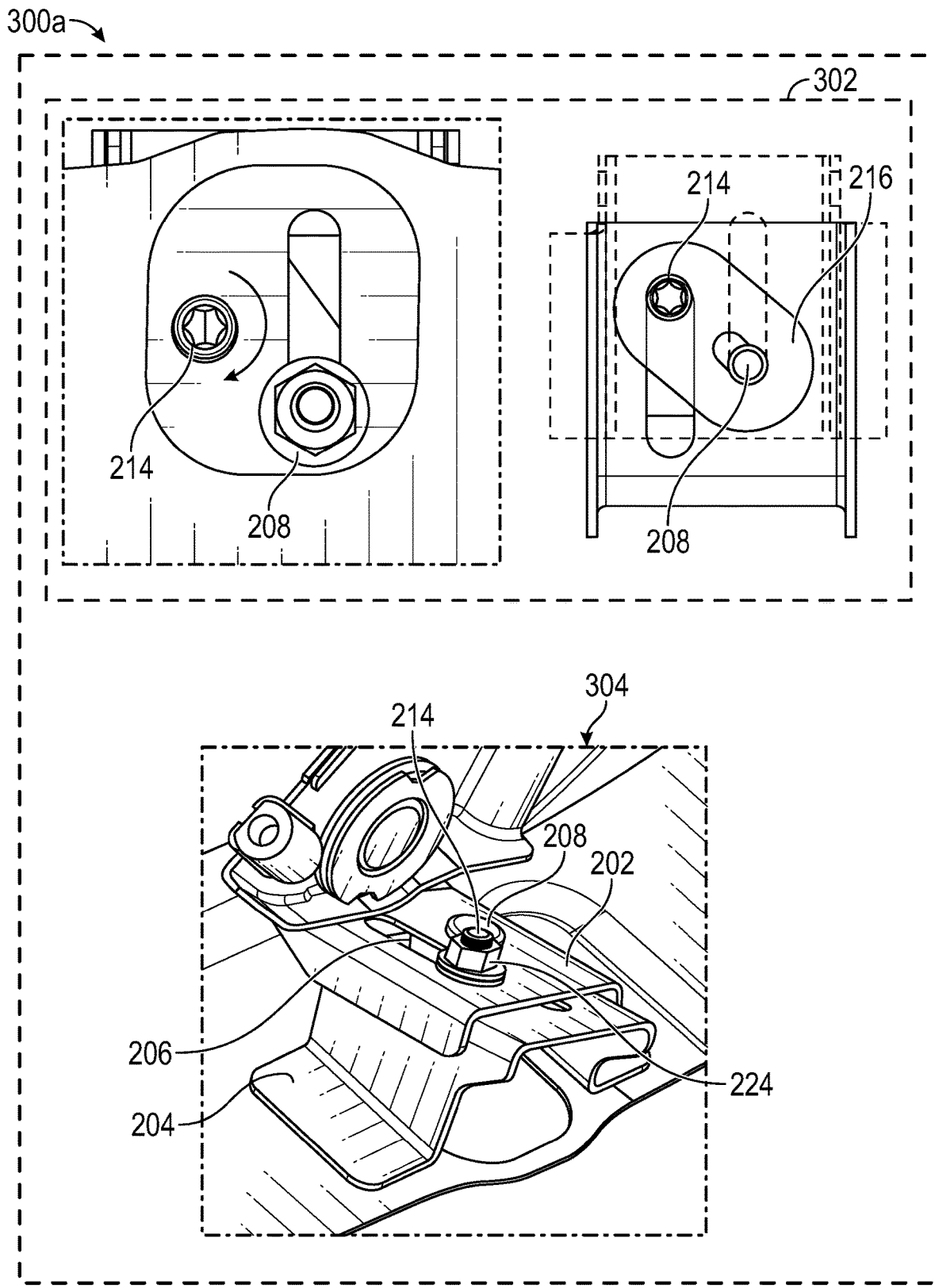
FIG. 3A is a diagram depicting an exemplary view of a tilt-glass tip in an outboard condition, in accordance with one or more exemplary embodiments.

Referring to FIG. 3A, a diagram 300a may depict an exemplary view of a tilt-glass tip in an outboard condition, showcasing one or more exemplary embodiments. The diagram provides two distinct views, labeled as View 302 and View 304, where the mechanism's operation is illustrated.

In view 302, the camshaft 214 may be rotated in a clockwise direction, potentially enabling the tilt of the glass tip in an outboard condition. The controlled rotation of the camshaft 214 may induce the movement of the guide rail bracket 202, thereby tilting the glass in an outward direction. The camshaft's potential to regulate the glass tilt may offer users the convenience to adjust the glass position as needed, providing enhanced versatility and adaptability.

In view 304, the guide rail bracket 202 may be observed moving towards the inboard condition, which may occur as a direct result of the clockwise rotation of the camshaft 214. This synchronized movement may further enhance the tilt of the glass tip in an outboard position, facilitating smooth and precise adjustments.

The exemplary view presented in FIG. 3A may illustrate the practical application of the frameless door window regulator adjustment assembly, showcasing its potential to achieve controlled and user-friendly glass tilting in various conditions. The interaction between the camshaft 214 and the guide rail bracket 202 may potentially offer seamless functionality, aligning with the objective of providing users a reliable and convenient means to adjust the glass position according to their preferences.

Figure 3B:
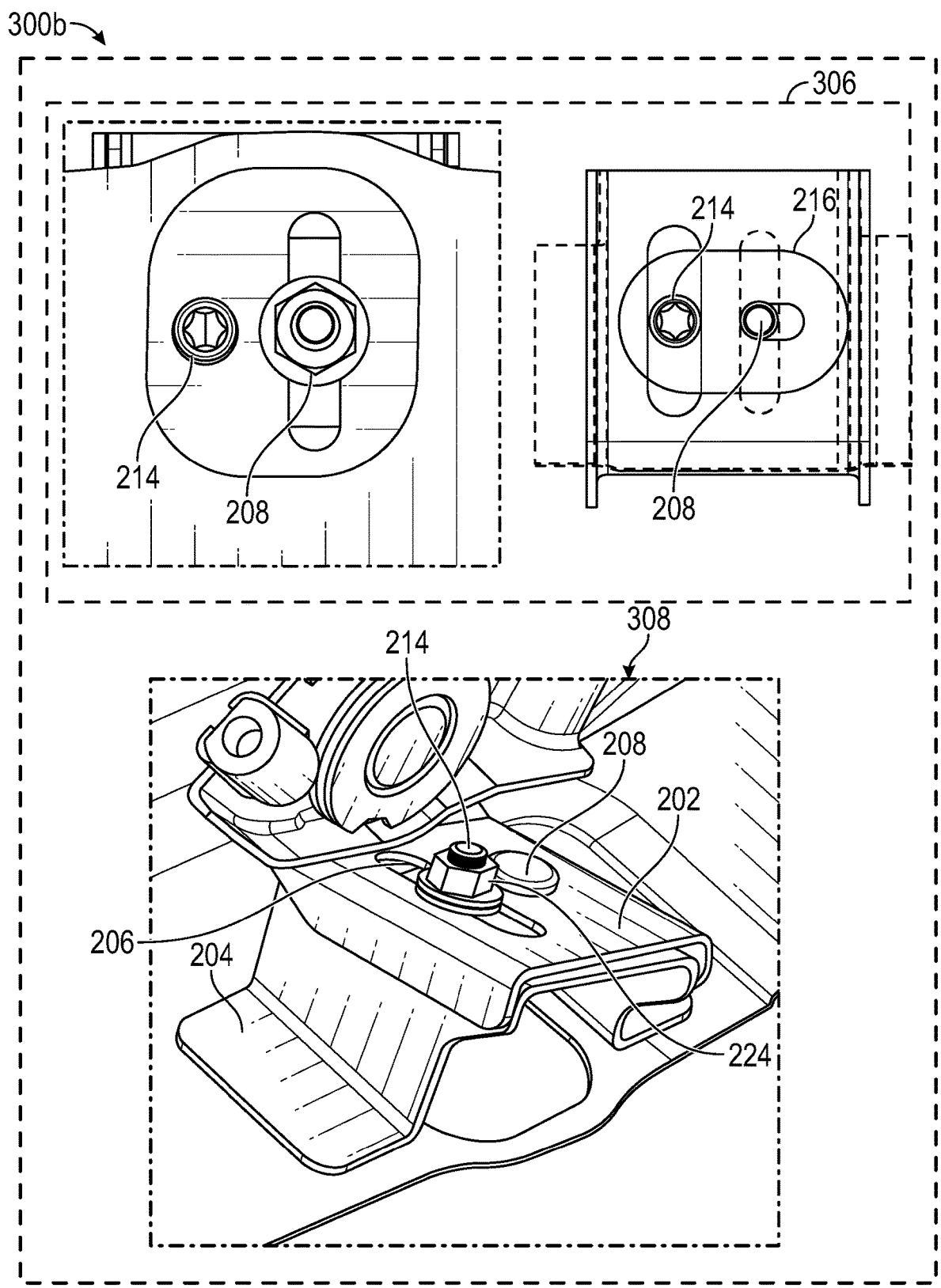
FIG. 3B is a diagram depicting an exemplary view of a tilt-glass tip in a nominal condition, in accordance with one or more exemplary embodiments.

Referring to FIG. 3B, a diagram 300b may depict an exemplary view of a tilt-glass tip in a nominal condition, in accordance with one or more exemplary embodiments. The diagram includes two distinct views, labeled as view 306 and view 308, which illustrate the mechanism's behavior in this state.

In view 306, the camshaft 214 may not be rotated, potentially resulting in the tilt glass tip staying in a nominal condition. The absence of rotation in the camshaft 214 may maintain the glass in its default or nominal position without any tilting. In view 308, the guide rail bracket 202 may not make any movement and remain at a nominal condition, which is attributed to the non-rotation of the camshaft 214. This static position of the guide rail bracket 202 further supports the glass's stable and non-tilted position.

The exemplary view presented in FIG. 3B may demonstrate the frameless door window regulator adjustment assembly's ability to maintain the glass in a nominal condition when the camshaft 214 is not rotated. This feature ensures the glass remains in its standard position without any tilting, offering users the flexibility to retain the glass in a stable configuration when desired.

Figure 3C:
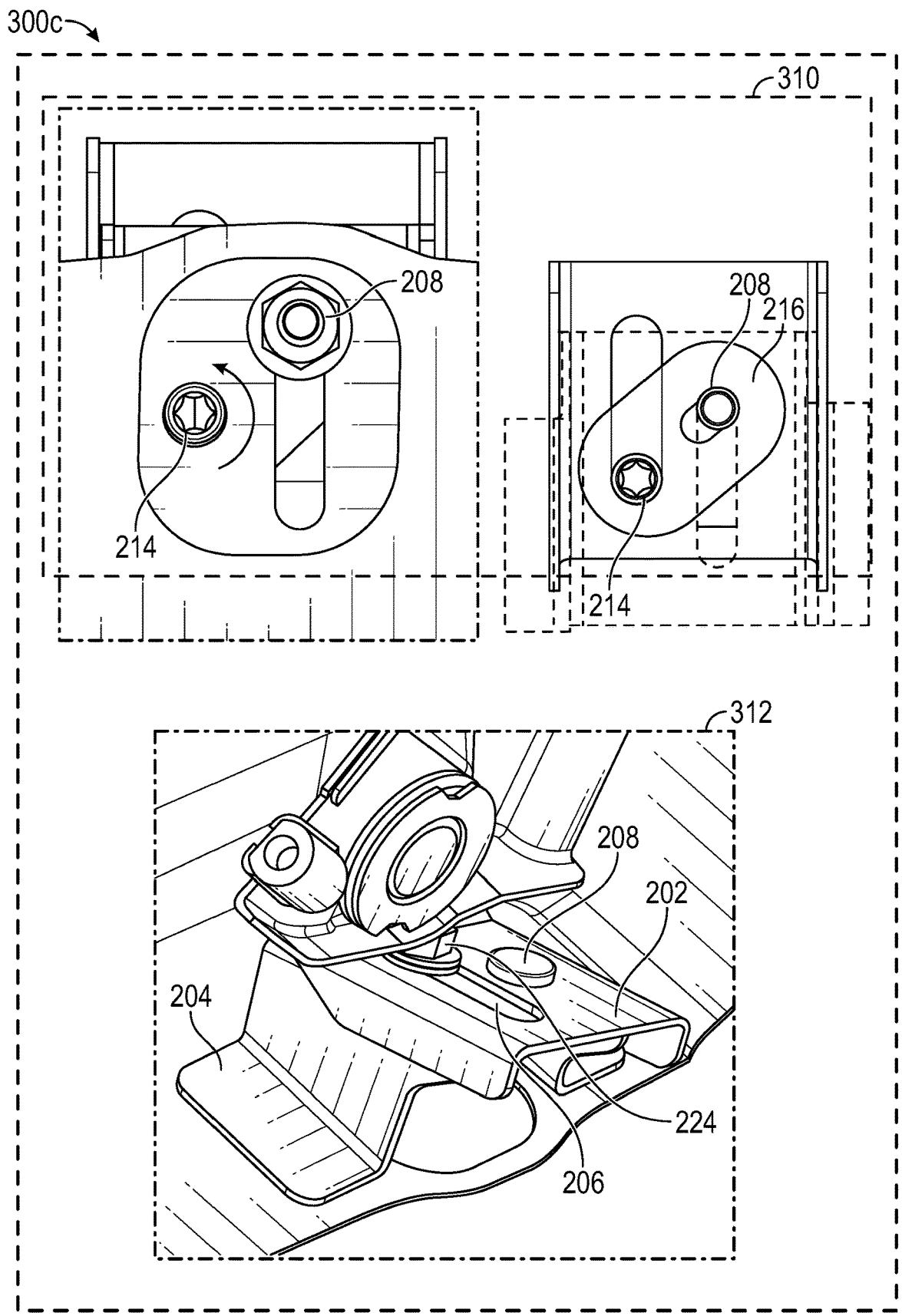
FIG. 3C is a diagram depicting an exemplary view of a tilt-glass tip in an inboard condition, in accordance with one or more exemplary embodiments.

Referring to FIG. 3C, a diagram 300c may depict an exemplary view of a tilt-glass tip in an inboard condition, in accordance with one or more exemplary embodiments. The diagram includes two distinct views, labeled as view 310 and view 312, illustrating the mechanism's operation in this scenario.

In view 310, the camshaft 214 may be rotated in an anti-clockwise direction, potentially leading to the tilt of the glass tip in an inboard condition via the guide rail bracket 202. The controlled anti-clockwise rotation of the camshaft 214 may induce the movement of the guide rail bracket 202, thereby tilting the glass in an inward direction. This adjustable tilt feature allows users to regulate the glass position as needed, catering to various preferences and requirements.

In view 312, the guide rail bracket 202 may be observed moving towards the outboard condition, a consequence of the anti-clockwise rotation of the camshaft 214. This coordinated motion reinforces the tilt of the glass tip in an inboard position, enabling smooth and precise adjustments as desired.

The exemplary view presented in FIG. 3C demonstrates the practical application of the frameless door window regulator adjustment assembly, showcasing its potential to achieve controlled and user-friendly glass tilting in diverse conditions. The interaction between the camshaft 214 and the guide rail bracket 202 offers seamless functionality, addressing the objective of providing users with a reliable and convenient means to adjust the glass position according to their preferences.

Figure 4A:
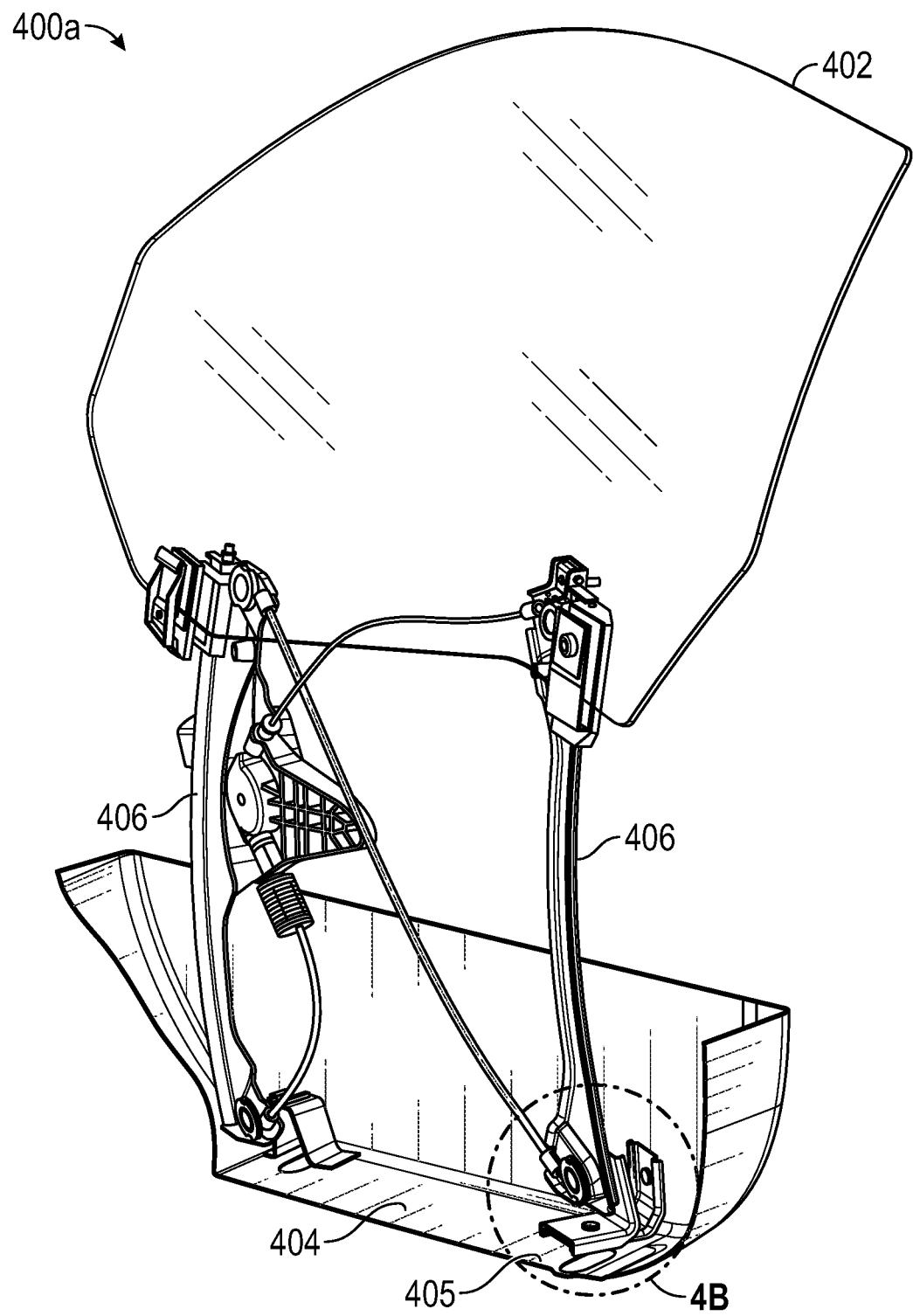
FIG. 4A is a diagram depicting a frameless door window regulator according to another non-limiting exemplary embodiment of the invention.

Referring to FIG. 4A, an exemplary diagram 400a may potentially depict a frameless door window regulator assembly, showcasing one or more exemplary embodiments. The diagram includes essential components such as the glass 402, the door inner panel 404, the lower guide rail attachment assembly 405, and the guide rail 406. Notably, the lower guide rail attachment assembly 405 in this illustration presents an alternative variation to the lower guide rail attachment assembly 105 shown in FIG. 1A.

The inclusion of the glass 402, door inner panel 404, guide rail 406, and the alternative lower guide rail attachment assembly 405 in this diagram offers insight into the construction and functioning of the frameless door window regulator assembly. The depicted variation of the lower guide rail attachment assembly 405 may demonstrate an alternative design or potential modifications to the previous embodiment, providing additional flexibility and adaptability in the assembly's implementation.

Figure 4B:
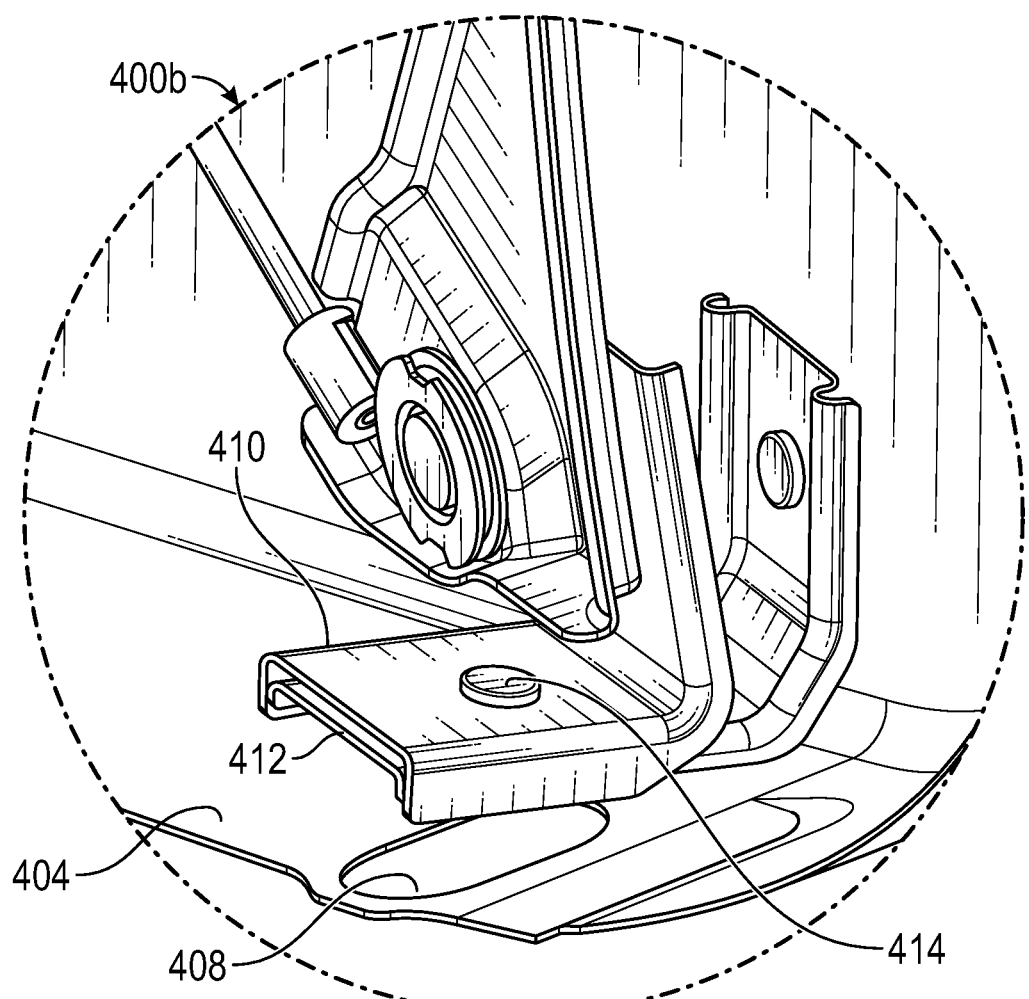
FIG. 4B is a diagram depicting a detailed view of the lower guide rail attachment assembly according to another non-limiting exemplary embodiment of the invention.

Referring to FIG. 4B, a diagram 400b may depict a detailed view of the lower guide rail attachment assembly in accordance with one or more exemplary embodiments. The diagram includes several important components, such as the door inner panel 404, the access hole 408, the guide rail bracket 410, the window regulator bracket 412, and the stud bolt 414.

The guide rail bracket 410 in this configuration may exhibit versatility in its design, as it can either be assembled onto the window regulator or integrated as part of the guide rail. Similarly, the window regulator bracket 412 may offer the same adaptability, allowing it to be either assembled onto the window regulator or integrated into the vehicle door assembly. This non-limiting exemplary embodiment exemplifies the various possibilities for assembling these brackets, granting flexibility during the manufacturing process and integration with existing components.

In this exemplary embodiment, the guide rail bracket slot is not required when the window regulator bracket is built as part of the window regulator assembly. This design simplification streamlines the assembly process, reducing complexity and enhancing overall efficiency during manufacturing. It further demonstrates the adaptability of the lower guide rail attachment assembly, accommodating different configurations based on specific assembly needs.

Figure 5:
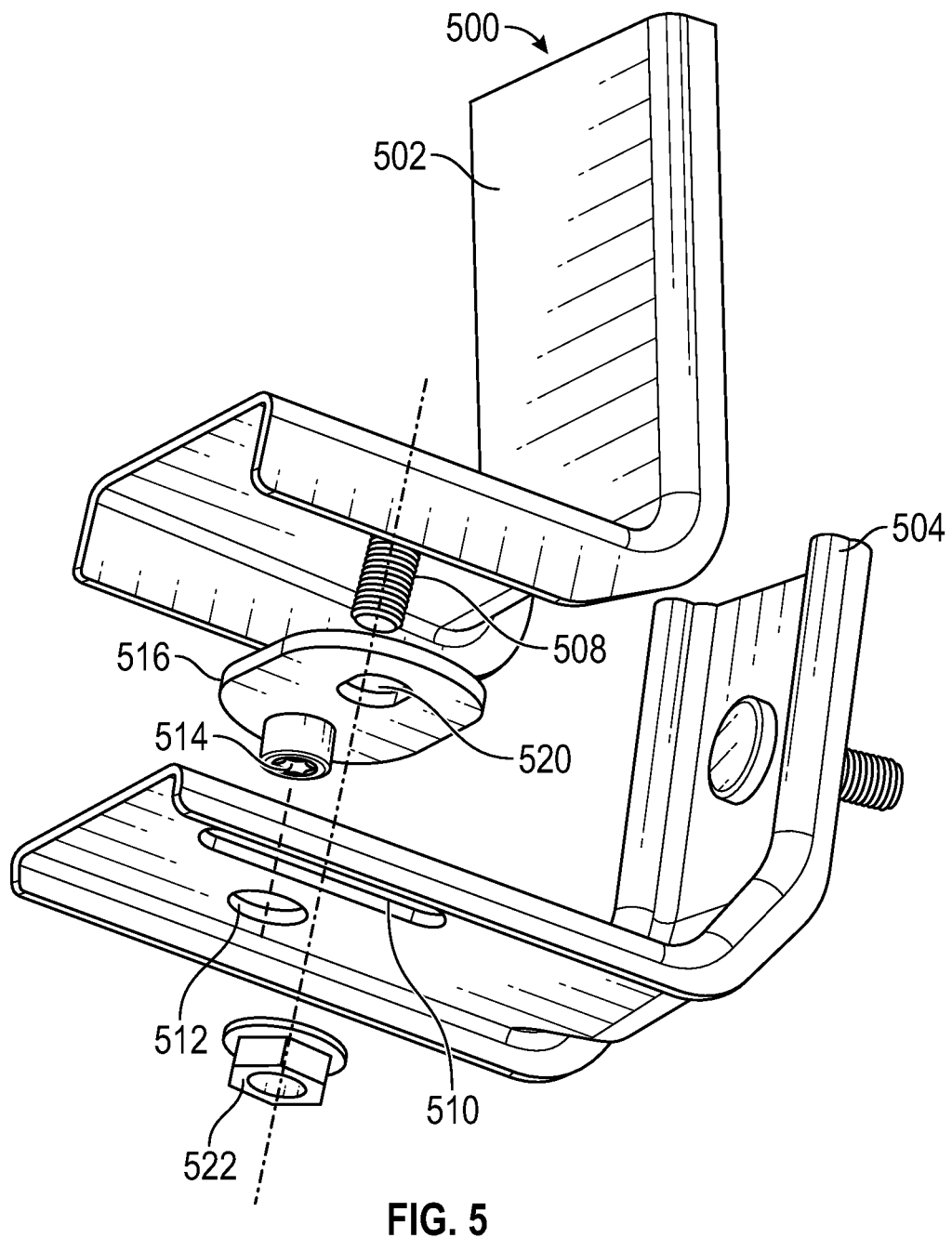
FIG. 5 is a diagram depicting an exploded view of the lower guide rail attachment assembly according to another non-limiting exemplary embodiment of the invention.

Referring to FIG. 5, an exemplary diagram 500 may potentially depict an exploded view of the lower guide rail attachment assembly, showcasing one or more exemplary embodiments of the invention. The diagram includes key components, such as the guide rail bracket 502, the window regulator bracket 504, the stud bolt 508, the window regulator bracket slot 510, the camshaft hole 512, and the camshaft 514. Additionally, it features the cam plate 516, the cam plate slot 520, and the stud bolt nut 522.

In this configuration, the lower guide rail attachment assembly 500 may demonstrate an alternative variation to the lower guide rail attachment assembly 200 shown in FIG. 2. This alternative configuration may offer enhanced adaptability and versatility, providing potential variations for specific assembly requirements. The camshaft hole 512 of the window regulator bracket 504 may be designed to support and locate the camshaft 514, enabling smooth rotation. The non-rotatable connection between the camshaft 514 and cam plate 516 may enhance stability and prevent unintentional adjustments during operation, potentially promoting precise and controlled glass movement. Moreover, the camshaft 514 in this exemplary embodiment may be either assembled onto the cam plate 516 or built as an integral part of the cam plate 516. This design flexibility may allow for various implementation options, potentially accommodating different manufacturing processes and assembly techniques.

Furthermore, the lower guide rail attachment assembly 500 may exemplify an alternative variation wherein the camshaft 514 is built as an integral part of the cam plate 516, and the window regulator bracket 504 is built as part of the window regulator assembly. As a result, the guide rail bracket slot and the pre-assembly of the camshaft and cam plate to the guide rail bracket may not be required, potentially streamlining the assembly process and enhancing overall efficiency.

The exemplary view presented in FIG. 5 may offer valuable insights into the detailed construction and potential functional aspects of the lower guide rail attachment assembly. It may demonstrate the potential configurations and variations that can be employed to achieve specific objectives and potentially optimize the performance of the frameless door window regulator assembly.

Figure 6:
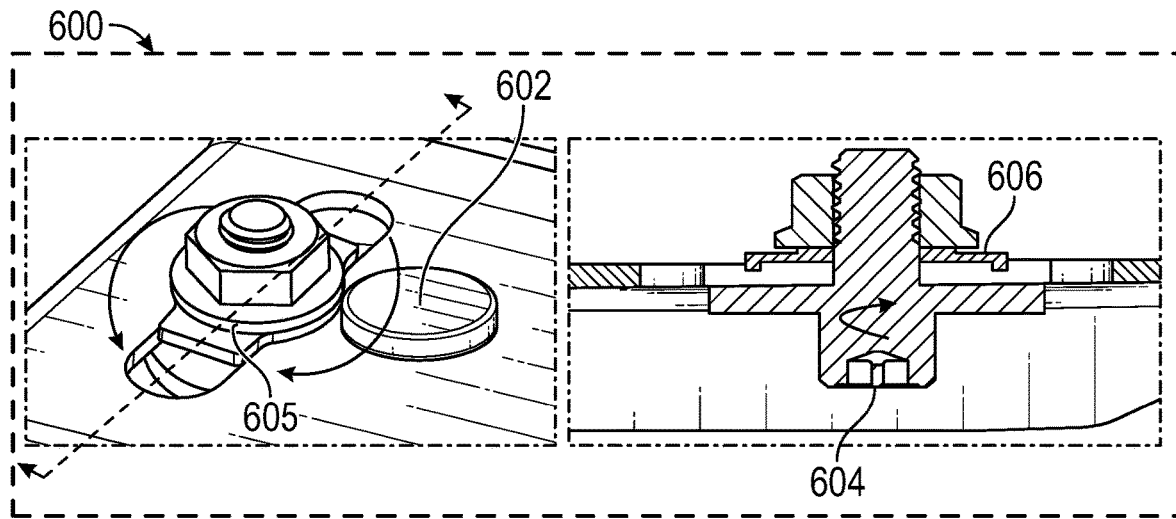
FIG. 6 is a diagram depicting the nominal position of the camshaft according to a preferred embodiment of the invention.

Referring to FIG. 6, an exemplary diagram 600 may potentially depict the nominal position of the camshaft according to a preferred embodiment of the invention. The diagram includes several important components, such as the stud bolt 602, camshaft 604, nut 605, and a washer 606. The washer may be made of elastic material, contributing to its flexibility and utility in the assembly process.

When assembling the components, the washer 606 may be engaged in a non-rotatable manner with the camshaft 604, ensuring a secure and stable connection. Additionally, during the installation phase, the washer 606 may temporarily engage with the guide rail bracket slot, temporarily maintaining the nominal position of the camshaft and cam plate until the window regulator is installed to the window regulator bracket.

The thoughtful implementation of the washer 606 demonstrates the inventive approach to improving the installation process of the frameless door window regulator adjustment assembly. Its ability to securely hold the components in place during assembly adds to the overall efficiency and effectiveness of the window regulator mechanism.

Figure 7:
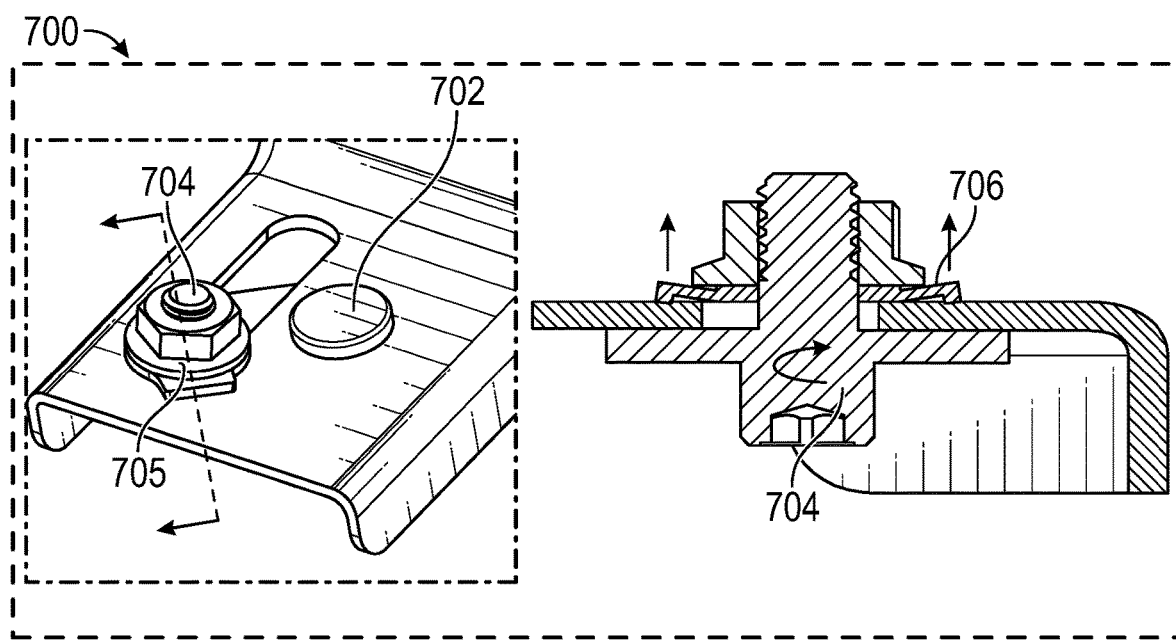
FIG. 7 is a diagram depicting the rotated position of the camshaft according to a preferred embodiment of the invention.

Referring to FIG. 7, an exemplary diagram 700 may potentially depict the rotated position of the camshaft according to a preferred embodiment of the invention. The diagram includes several important components, such as the stud bolt 702, camshaft 704, nut 705, and a specially designed washer 706.

During the operation of the frameless door window regulator adjustment assembly, the camshaft 704 may be rotated, initiating the desired glass tilting movement. In this process, the washer 706 may disengage from the guide rail bracket slot, facilitating smooth and controlled rotation of the camshaft.

The washer's purposeful disengagement during rotation enables efficient movement of the camshaft and cam plate, supporting precise glass positioning and enhancing the overall functionality of the window regulator assembly. This innovative design feature ensures a user-friendly experience and contributes to the assembly's optimal performance, meeting the requirements for reliable and convenient window adjustment in a frameless door window regulator system.

Figure 8A:
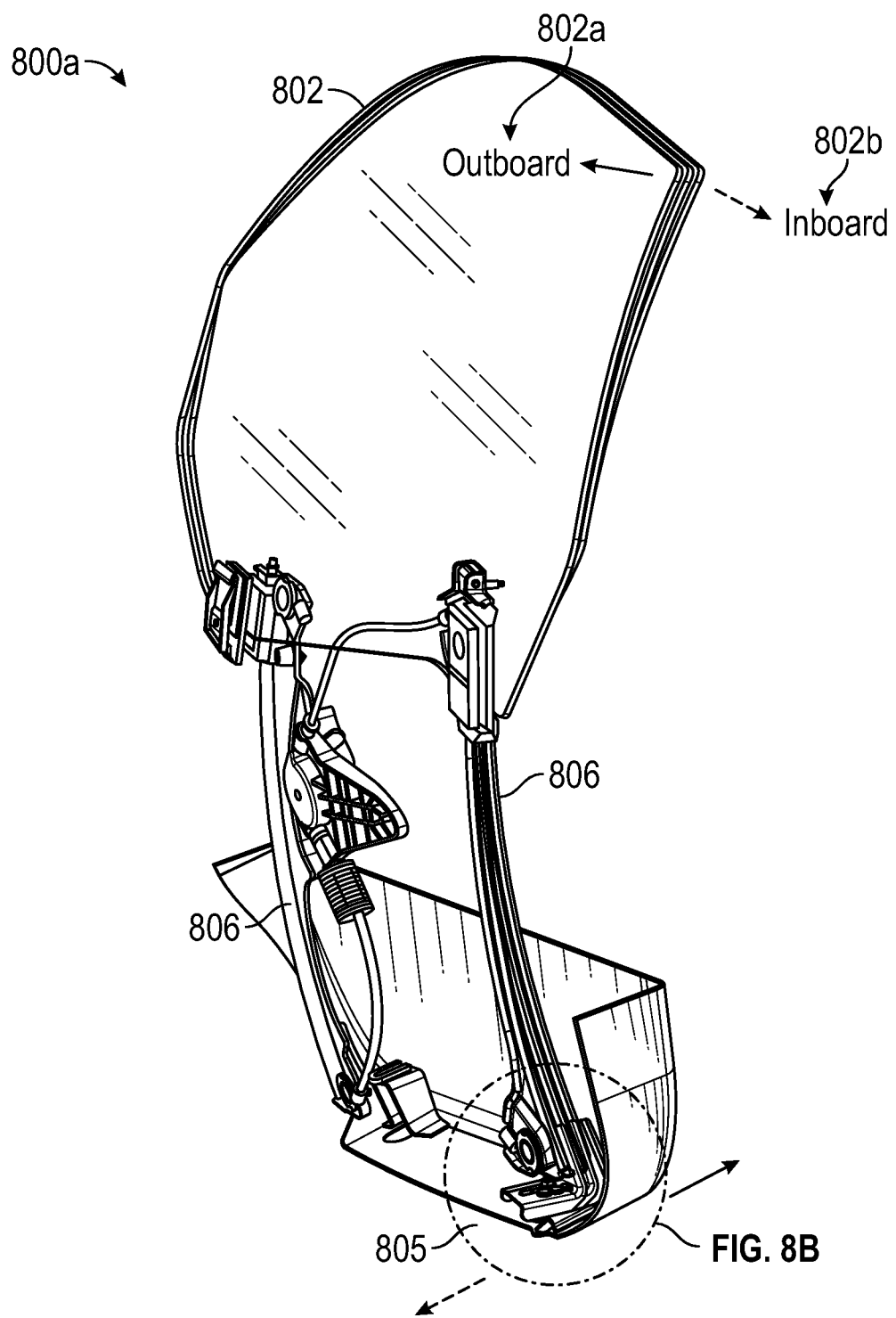
FIG. 8a is a diagram depicting an exemplary view of a tilt-glass tip inboard and outboard conditions in relation to the guide rail bracket movement.

Referring to FIG. 8a, diagram 800a illustrates an exemplary depiction of the tilt-glass tip exhibiting inboard and outboard conditions, relative to the movement of the guide rail bracket, in accordance with a preferred embodiment of the present invention. The variations in glass tilt are illustrated through two distinct conditions: the tilt-glass tip positioned in the outboard condition 802a and the tilt-glass tip positioned in the inboard condition 802b. These variations in tilt are achieved through the controlled movement of the guide rail bracket, which plays a pivotal role in altering the orientation of the glass.

Figure 8B:
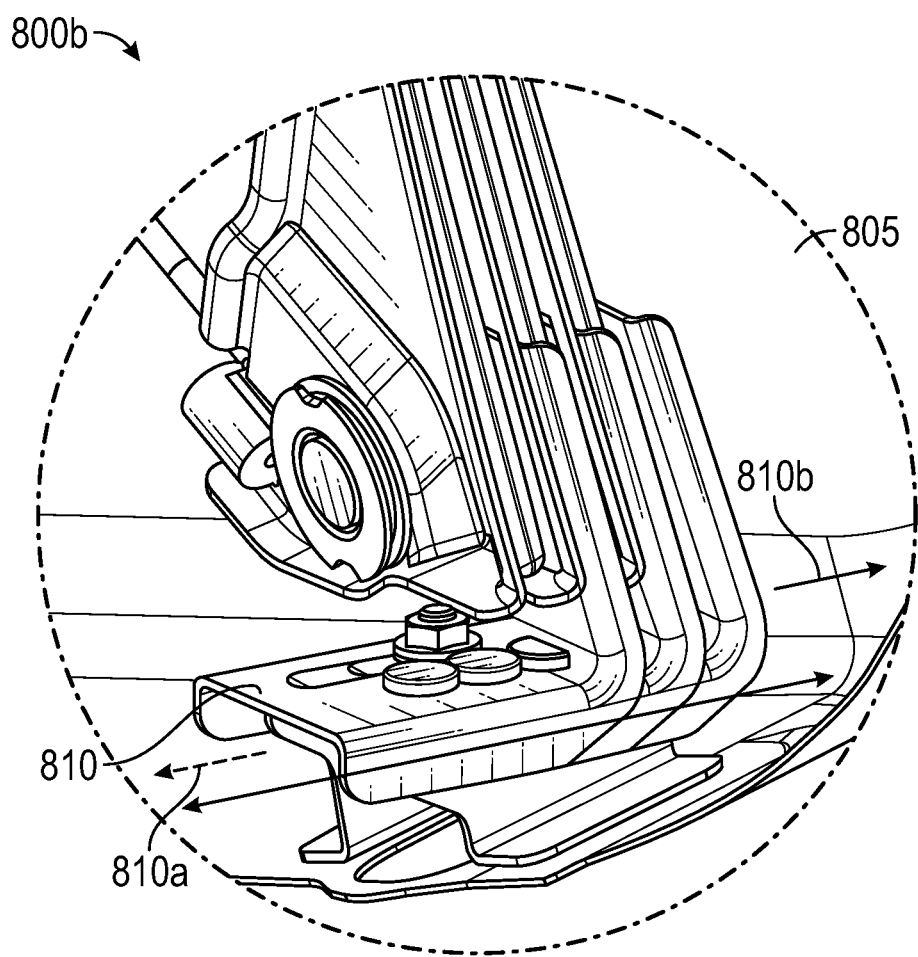
FIG. 8b is a diagram depicting a detailed view of guide rail bracket movement towards inboard and outboard conditions.

Referring to FIG. 8b, diagram 00b illustrates a detailed view of guide rail bracket movement towards inboard and outboard conditions. When the guide rail bracket 810 undergoes a movement towards the outboard position, as indicated by the label 810a, the tilt-glass tip follows suit by transitioning to the inboard condition. Conversely, when the guide rail bracket 810 moves towards the inboard position, represented by the label 810b, the tilt-glass tip shifts to the outboard condition. This mechanism of guide rail bracket movement provides a means to effectively adjust the tilt of the glass, thereby enhancing the versatility and functionality of the frameless door window regulator adjustment assembly. Through this dynamic interaction between the guide rail bracket and the tilt-glass tip, occupants can tailor the glass angle to their preferences.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and subcombinations of the various features described hereinabove as well as variations and modifications thereof, which would occur to persons skilled in the art upon reading the foregoing description.

What is claimed is:

1. A frameless door window regulator adjustment assembly comprising:
an upper guide rail attachment mounted at an upper portion of a guide rail and a lower guide rail attachment mounted at lower portion of the guide rail, whereby the lower guide rail attachment is configured to tilt the guide rail and a glass, whereby the lower guide rail attachment comprises a guide rail bracket and a window regulator bracket are mounted on a door inner panel, a cam plate is sandwiched between the guide rail bracket and the window regulator bracket;
the guide rail bracket is configured with a guide rail bracket slot and a stud bolt, the window regulator bracket is configured with a window regulator bracket slot and a camshaft hole, the guide rail bracket slot is aligned with the camshaft hole of the window regulator bracket, and the stud bolt of the guide rail bracket is aligned with the window regulator bracket slot;
the cam plate is configured with an anti-rotation hole and a cam plate slot, whereby the anti-rotation hole of the cam plate is aligned with the guide rail bracket slot and the camshaft hole of the window regulator bracket, and the cam plate slot is aligned with the stud bolt of the guide rail bracket and the window regulator bracket slot;
the stud bolt of the guide rail bracket is configured to connect the guide rail bracket and the window regulator bracket by introducing the stud bolt through the cam plate slot and the window regulator bracket slot;
a camshaft is configured to connect the window regulator bracket and the cam plate by introducing the camshaft through the camshaft hole of the window regulator bracket and the anti-rotation hole of the cam plate, whereby the camshaft rotation enables the stud bolt to move within the window regulator bracket slot, the rotary motion of the camshaft is transmitted to the stud bolt via the cam plate, enabling the guide rail bracket to move along the slot of the window regulator bracket, thereby tilting the guide rail and the glass via the window regulator adjustment assembly.

2. The frameless door window regulator adjustment assembly of claim 1, wherein the camshaft hole of the window regulator bracket is configured to support the camshaft and locate the camshaft to enable rotation.

3. The frameless door window regulator adjustment assembly of claim 1, wherein the camshaft and cam plate are non-rotatably connected.

4. The frameless door window regulator adjustment assembly of claim 1, wherein the window regulator bracket is either assembled onto the window regulator or integral to the vehicle door assembly.

5. The frameless door window regulator adjustment assembly of claim 1, wherein the guide rail bracket is either assembled onto the window regulator or integral to the guide rail.

6. The frameless door window regulator adjustment assembly of claim 1, wherein the camshaft is either assembled onto the cam plate or built as an integral part of the cam plate.

7. The frameless door window regulator adjustment assembly of claim 1, wherein the camshaft and cam plate are made of a material selected from the group consisting of machined steel, stamped steel, cold-headed steel, powder metal, and Zinc/Aluminum die-casting.

8. The frameless door window regulator adjustment assembly of claim 1, wherein the cam plate is configured to be sandwiched between the guide rail bracket and the window regulator bracket providing enough surface area to be securely clamped by screw to fix the window regulator to the door.

9. The frameless door window regulator adjustment assembly of claim 1, wherein the cam shaft and the cam plate are pre-attached to the guide rail bracket through the guide rail bracket slot by a fastener including screw, bolt, nut, C-clip, push nut and staking.

10. The frameless door window regulator adjustment assembly of claim 1, wherein the cam shaft and the cam plate are rotatably and slide-ably secured to the guide rail bracket through the guide rail bracket slot by a fastener including screw, bolt, nut, C-clip, push nut and staking.

11. The frameless door window regulator adjustment assembly of claim 10, wherein the fastener is being used along with a washer, whereby the washer is made of elastic material and non-rotatably engages to the camshaft, and temporally engages to the guide rail bracket slot in order to keep the camshaft and cam plate in the nominal position until the window regulator is installed to the window regulator bracket.

12. The frameless door window regulator adjustment assembly of claim 10, wherein the fastener is being used along with a washer, whereby the washer disengages to the guide rail bracket slot when the camshaft is rotated.

13. The frameless door window regulator adjustment assembly of claim 1, wherein the guide rail bracket slot and pre-assembly of the camshaft and cam plate to the guide rail bracket are not required when the window regulator bracket is built as part of the window regulator assembly.

* * * * *